United States Patent
Faccin

(10) Patent No.: US 6,246,004 B1
(45) Date of Patent: Jun. 12, 2001

(54) ELECTRICAL WIRING FRAME

(76) Inventor: Gino Faccin, 11 rue du Monastère, 68440, Zimmersheim (FR)

( * ) Notice: Subject to any disclaimer, the term of this patent is extended or adjusted under 35 U.S.C. 154(b) by 0 days.

(21) Appl. No.: 09/402,043

(22) PCT Filed: Mar. 25, 1998

(86) PCT No.: PCT/FR98/00599

§ 371 Date: Sep. 27, 1999

§ 102(e) Date: Sep. 27, 1999

(87) PCT Pub. No.: WO98/44609

PCT Pub. Date: Oct. 8, 1998

(30) Foreign Application Priority Data

Mar. 27, 1997 (FR) .................................................. 97 04169

(51) Int. Cl.[7] .......................................................... H02G 3/04
(52) U.S. Cl. ............................. 174/95; 174/135; 361/813
(58) Field of Search ..................................... 361/679, 732, 361/825, 829, 813; 174/135, 72 R, 95

(56) References Cited

U.S. PATENT DOCUMENTS 5,982,610 * 11/1999 Crawford et al. ................... 361/641

FOREIGN PATENT DOCUMENTS

| | | |
|---|---|---|
| 0352149 | 1/1990 | (EP) . |
| 2233731 | 1/1975 | (FR) . |
| 2433886 | 3/1980 | (FR) . |
| 2682229 | 4/1993 | (FR) . |

* cited by examiner

*Primary Examiner*—Shawn Riley
(74) *Attorney, Agent, or Firm*—Davis & Bujold, P.L.L.C.

(57) ABSTRACT

The invention concerns an electrical wiring frame for housing electrical appliances and the wiring thereof, comprising a quick, simple assembly system not requiring tools thereby considerably reducing assembly costs and time. Said frame (1) comprises at least two vertical members (2) and at least a horizontal rail (4) linked to the two vertical members by at least two generally omega-shaped stirrups (3), the stirrup base determining the spacing of the horizontal rail relative to the vertical members, the internal space defined by said stirrups being used as wiring duct, the horizontal rail (4) being provided with the standardized support (5) designed for housing electrical appliances and at least one binding post (6) arranged parallel to the support designed for fixing in position the electric wires connected to the electrical appliances. Said frame is characterized in that the mounting of the stirrups (3) on the vertical members (2), of the horizontal rail (4) on the stirrups (3), of the support (5) and of the binding post (6) on the horizontal rail (4) is a demountable jointing and locking assembly, the elements to be mutually assembled comprising respectively matching jointing and locking means arranged to co-operate mutually. The invention is applicable to electrical wiring.

20 Claims, 10 Drawing Sheets

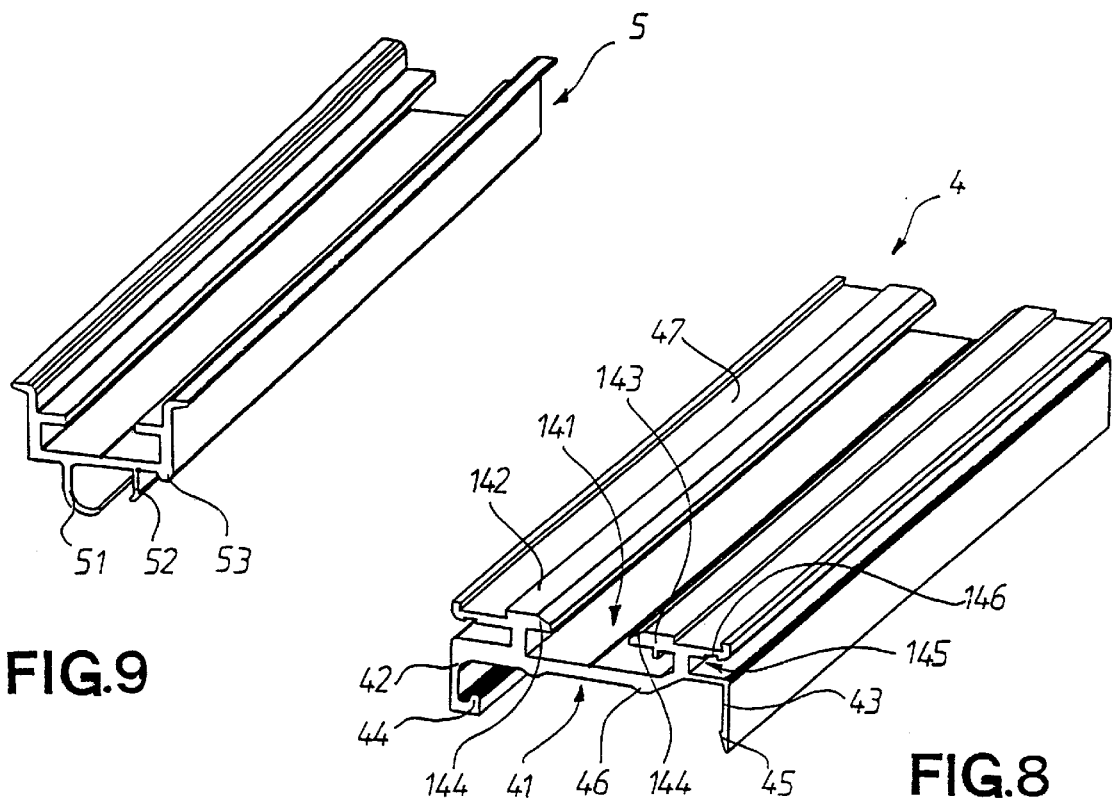
FIG.9
FIG.8
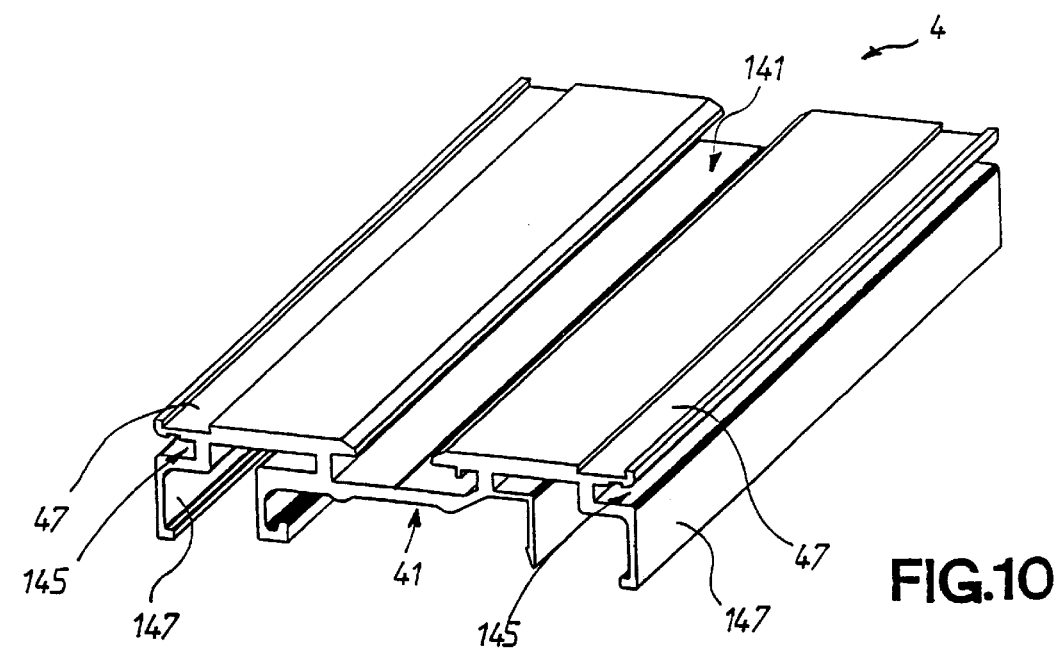
FIG.10

FIG. 11A
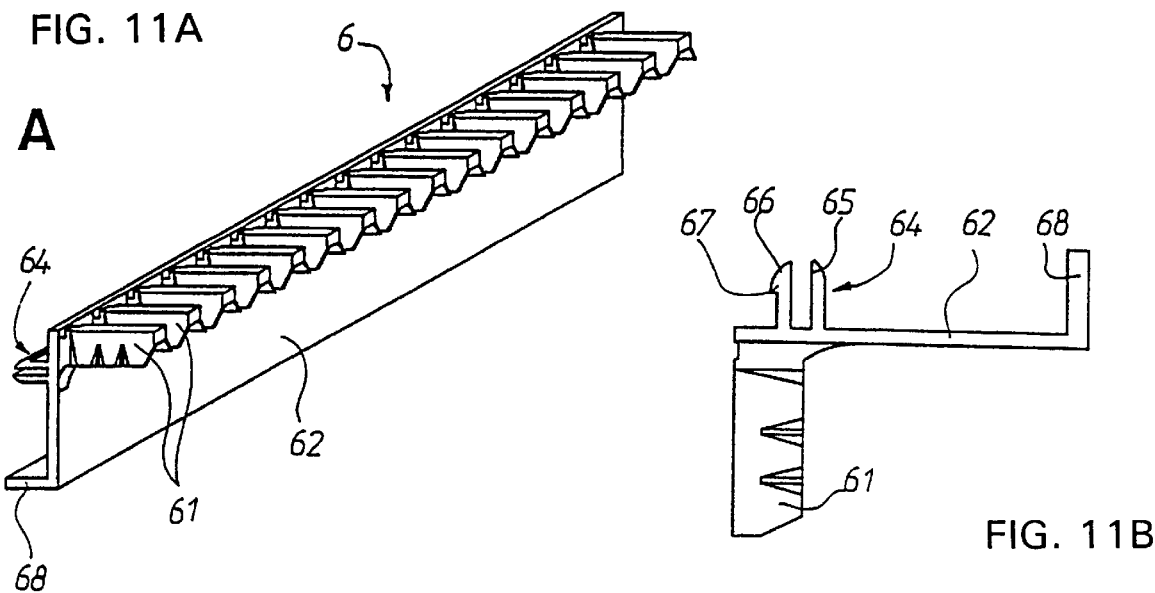
FIG. 11B
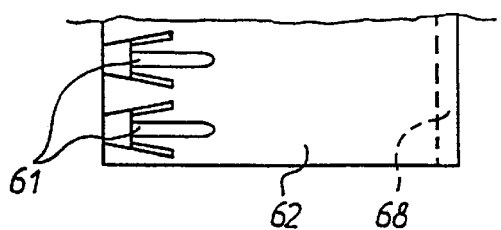
FIG. 11C
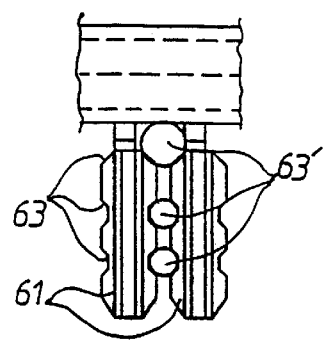
FIG. 11D

ELECTRICAL WIRING FRAME

The present invention relates to an electrical wiring frame designed to house electrical devices and the wiring thereof, comprising at least two vertical members arranged in parallel planes and at least one horizontal rail coupled to the vertical members by at least two generally omega-shaped stirrups, the base of the stirrups determining the distance between the horizontal rail and the vertical members, the internal space defined by these stirrups being used as a cable duct, the horizontal rail being provided with a standardized support designed to house the electrical devices and with at least one binding post comb arranged parallel to the support designed to fix in position the electric cables connected to said electrical devices.

This type of wiring frame is well known and generally used in switch cabinets. It allows the wiring to be organized in an orderly, clear and tidy manner, with the cables being positioned on the binding post combs and grouped together in the lateral ducts formed by the omega-shaped stirrups. Wiring is made significantly easier, as is the access to the electrical devices and their cables. Nevertheless, known frames are made using metal sections assembled with screw-nut systems which require relatively long installation times and appropriate tools. These installation times are twice as long when the position of the members and the rails has to be altered or adapted in relation to one another. Furthermore, the center distance between two consecutive horizontal rails can not be continuously adjusted given the fact that the fixing holes are provided at regular intervals. It is therefore not always possible to achieve an optimum layout of the switch cabinet. Moreover, the number of parts required to build this type of frame is relatively large given the considerable number of conceivable variations.

The present invention proposes to improve the currently known frames by proposing an assembly system which is quick, simple and requires no tools, making it possible to considerably reduce installation costs and times. Furthermore, this assembly system makes it possible to alter and adapt the position of the parts in relation to one another at will, to continually alter their center distances, particularly by making them slide in relation to one another, and to adjust the frame's architecture according to requirements. The parts making up this frame have been designed to adapt to various alternatives so as to limit the number thereof and therefore the cost of manufacturing the whole set.

This objective is achieved by a frame as described in the introduction and characterized in that the assembly of the stirrups on the vertical members, the horizontal rail on the stirrups, the support and the binding post comb on the horizontal rail is achieved by fitting and locking them together in a removable manner, the elements to be assembled together respectively comprising matching fitting and locking means designed to cooperate with one another.

These matching fitting and locking means can be arranged to co-operate with one another by bringing said elements together in a movement of translation perpendicular to said elements and/or in a rotation.

In a preferred form of embodiment of the invention, the vertical member is formed by a metal section, one side of which comprises a rounded pivot on one of the edges and a groove on the other edge. This vertical member can have a substantially square overall cross-sectional area which is symmetrical in relation to a center plane parallel to said side provided with the pivot and the groove.

In the preferred form of embodiment, on its branch located on the vertical member side, the stirrup comprises an external projection forming a rounded hook designed to fit onto the pivot provided on said vertical member and an outwardly curved free end forming an elastic tongue provided with a nose arranged to lock into the groove provided on said vertical member by fitting into it after the stirrup has rotated around said pivot, the distance between the hook and the nose being less than or equal to the distance between the pivot and the groove, the stirrup and/or the vertical member comprising reliefs in the interlocking zone, designed to form stops.

On its branch located on the vertical member side, the stirrup advantageously comprises at least one hole designed to receive a fastening device mounted to slide in a groove provided in the vertical member and designed to lock the position of said stirrup.

On its branch located on the horizontal rail side, this stirrup also comprises a free end which is outwardly curved forming an angle of approximately 90° with its branch and is provided with a groove.

Preferably, the horizontal rail is formed by a metal section comprising a C-shaped longitudinal groove on its rear face, the free end of one of the branches being curved and having an enlargement designed to fit onto a first edge of the corresponding branch of said stirrup and the free end of the other branch forming an elastic tongue provided with a nose designed to lock onto the second edge of the corresponding branch of said stirrup by fitting onto it after said horizontal rail has rotated around said first edge, the distance between the two branches of the C-shaped groove being at most equal to the width of the stirrup's branch, the stirrup and/or the horizontal rail comprising reliefs in the interlocking zone, designed to form stops. This horizontal rail also comprises an upside down T-shaped longitudinal groove on the front.

In the preferred form of embodiment, the support is formed by a metal section and on the rear face it comprises two elastic catching tabs and a boss, the tabs are arranged to fit into the T-shaped groove provided on the front of the horizontal rail after a rotation around the boss while resting on said rail, the end of one of the tabs being curved to rest on the bottom of the groove and the end of the other tab having a hook to lock itself at the rear of the corresponding free end of said groove, the outside distance defined by the two tabs being at least equal to the space between the two free edges of the groove and the distance between the boss and the tab's hook being at most equal to the thickness of said free edge.

Advantageously, the horizontal rail comprises, on its longitudinal edges, at least one U-shaped longitudinal groove provided with at least one longitudinal recess in one of its branches, and the binding post comb comprises a fastening foot provided with two elastic tongues, one of which has a notch designed to lock into the longitudinal recess provided in said U-shaped groove by fitting the fastening foot after the binding post comb translates in the direction of the horizontal rail.

This binding post comb preferably comprises a rear extension ended with a heel designed to fit onto the rear part of the horizontal rail, the space between the heel and the fastening foot being less than or equal to the width of said rail in the interlocking zone.

The binding post comb also comprises a plurality of teeth parallel to one another, each of which comprises on its sides at least one cell for a housing between two consecutive teeth to receive an electrical cable and keep it in position.

In the preferred form of embodiment, the frame comprises an insulating cover designed to cover at least partially said stirrup, comprising at least one large branch coupled to the branch located on the vertical member side and provided with a groove on its free end.

This frame can also comprise at least one cover arranged to cover the gap between two frames placed side by side, said cover comprising at least one groove on its longitudinal edges, which is designed to fit onto the corresponding free ends of the branches of the stirrup and the insulating cover.

Preferably, this cover comprises at least in a central zone, deformable longitudinal undulations arranged to adapt the width of the cover to the gap between the two frames and make up the difference in levels between the two frames.

In order to close the sides of said frame, the latter advantageously comprises at least one side plate comprising on its longitudinal edges at least one groove arranged to fit onto the free ends of the corresponding branches of the stirrup and the insulating cover.

The vertical members, the horizontal rails, the stirrups and the supports can be made by extrusion, from a material chosen from the group which includes aluminum, aluminum alloy, stainless steel, steel and synthetic materials.

Likewise, the insulating covers, the binding post combs, the covers and the side plates can be made from a dielectric synthetic material.

The present invention and its advantages shall become apparent in the following description of an example of embodiment, with reference to the attached drawings, in which:

FIGS. 1A to F show the various stages involved in assembling a frame according to the invention, FIG. 2 is a perspective of an assembled frame, FIG. 3 is a perspective of a vertical member of the frame, FIG. 4 is a perspective of another vertical member, FIG. 5 is a perspective of a stirrup, FIG. 6 is a perspective of an insulating cover for a stirrup.

FIG. 8 is a perspective of one of the frame's horizontal rails,

FIG. 9 is a perspective of a supporting metal section,

FIG. 10 is a perspective of another one of the frame's horizontal rails,

Figure 12:
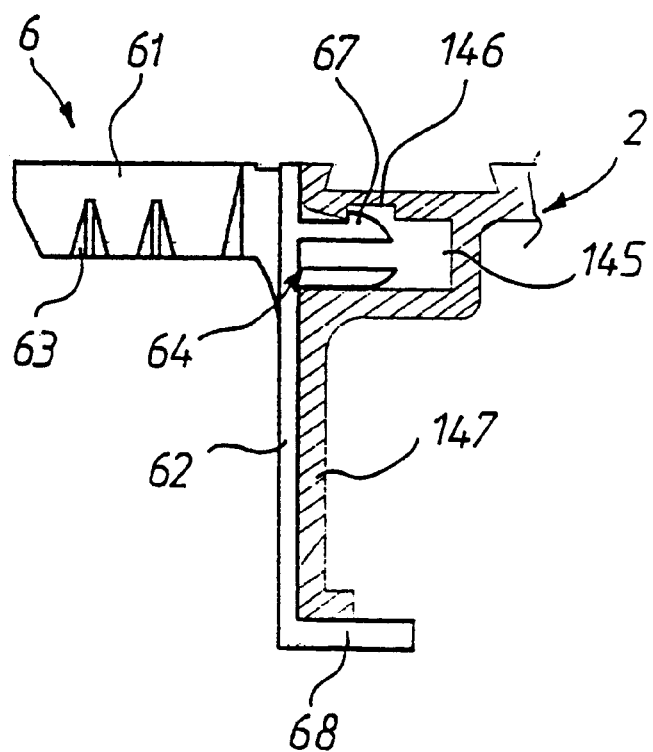
Figure 13:
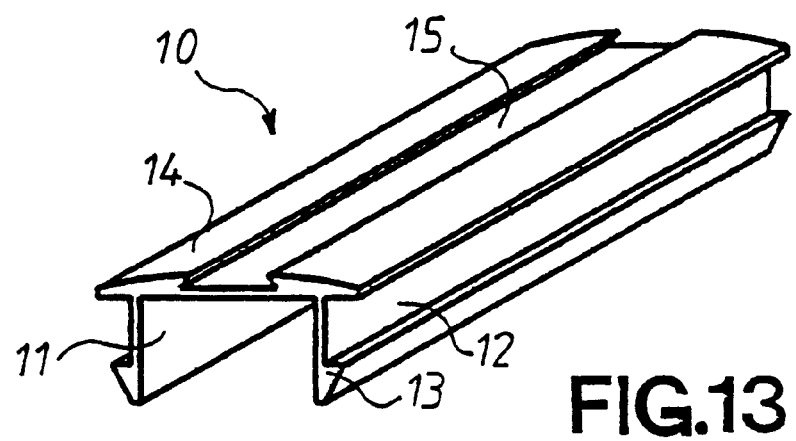
Figure 14:
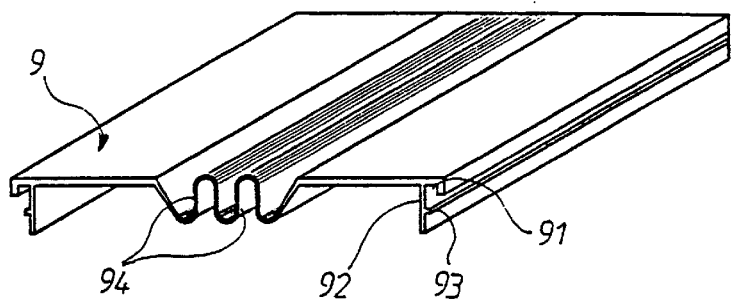
Figure 15:
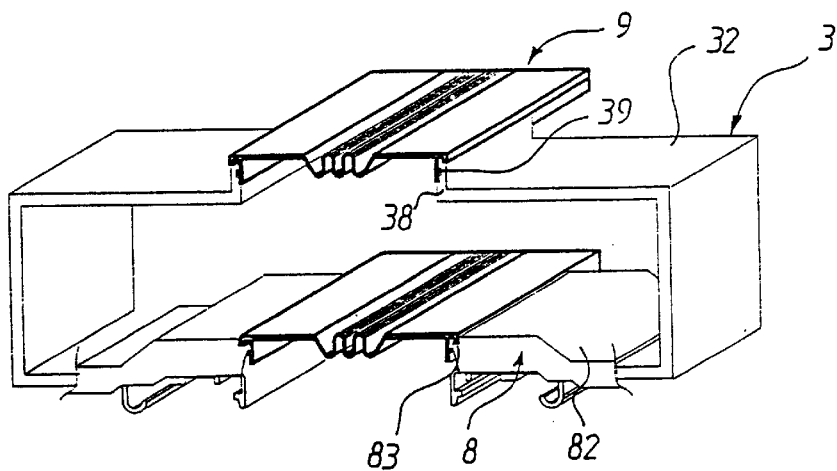
Figure 16:
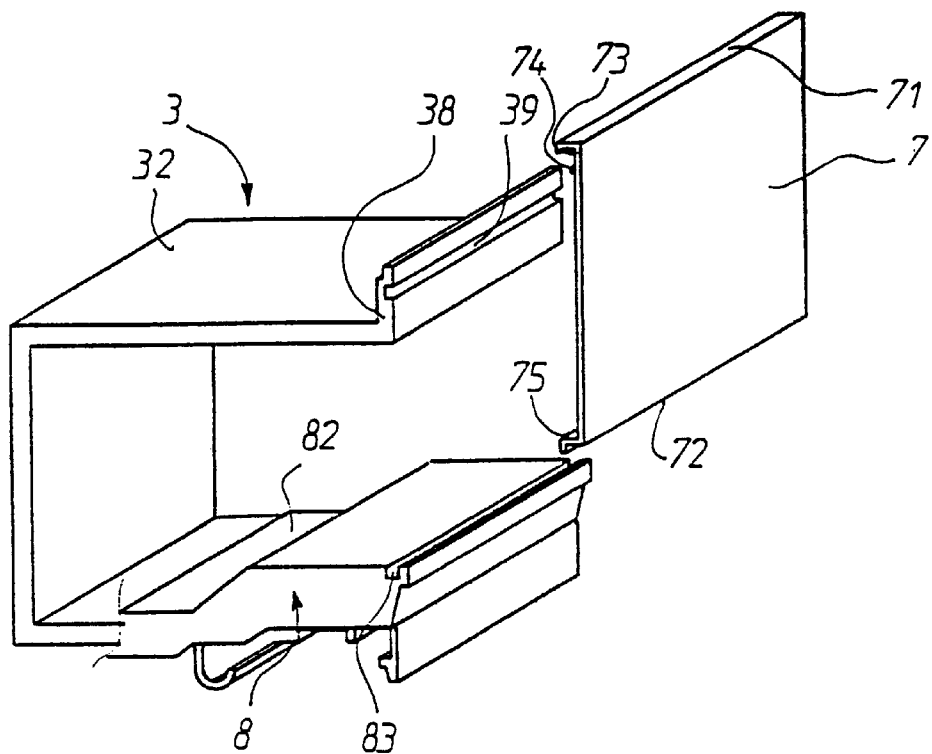
Figure 17:
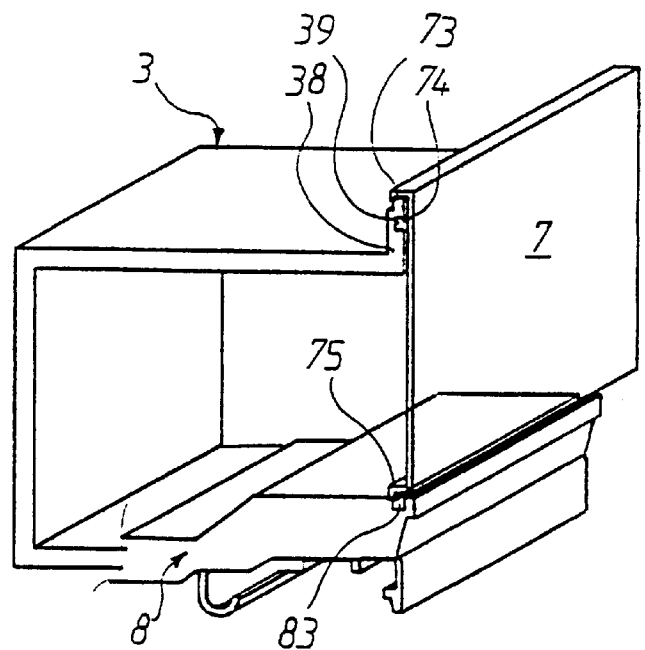

FIGS. 11A to D are views of the frame's binding post comb, respectively a perspective, front view, bottom view and right-hand view, FIG. 12 is a partial view of a binding post comb mounted in a horizontal rail belonging to the frame, FIG. 13 is a perspective of a cover between two binding post combs, FIG. 14 is a perspective of a cover between two frames, FIG. 15 is a partial perspective of two covers mounted on stirrups of two adjacent frames, FIG. 16 is a perspective of a side plate to be mounted on a stirrup, and FIG. 17 is a partial perspective of a side plate mounted on a stirrup.

Figure 1A:
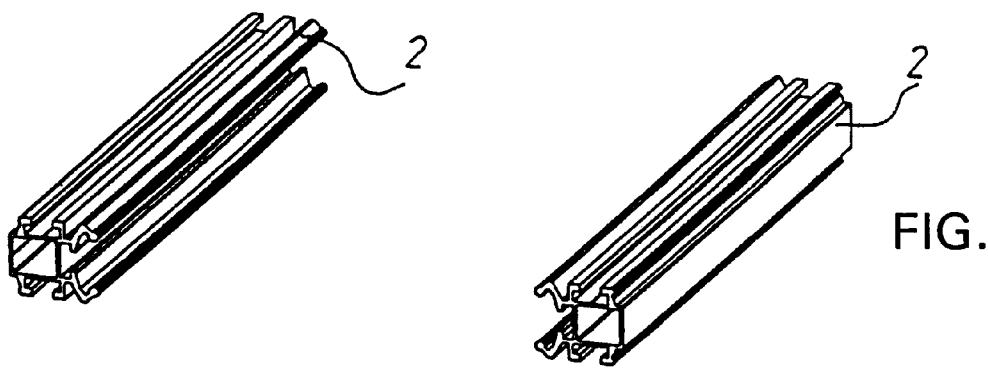
Figure 1B:
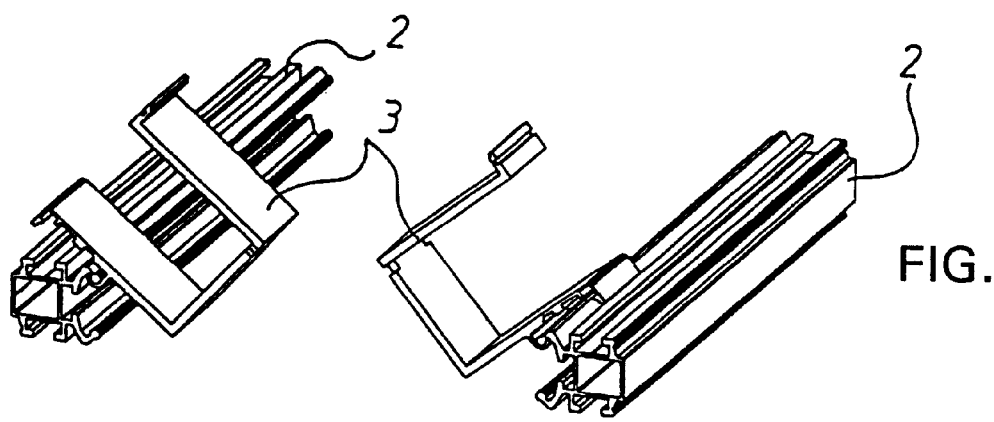
Figure 1C:
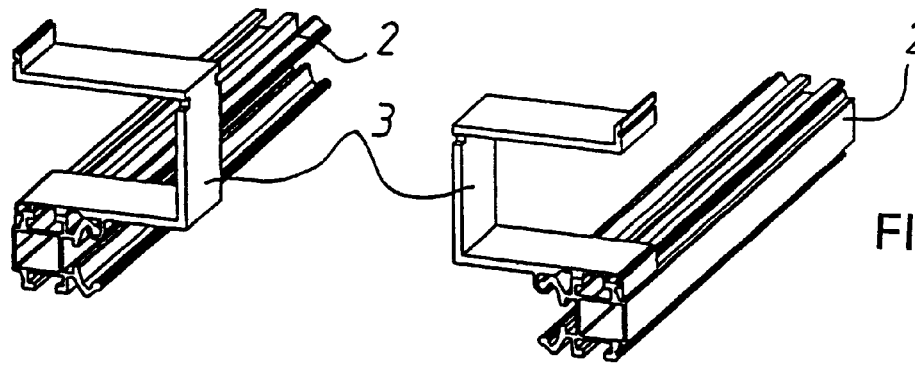
Figure 1D:
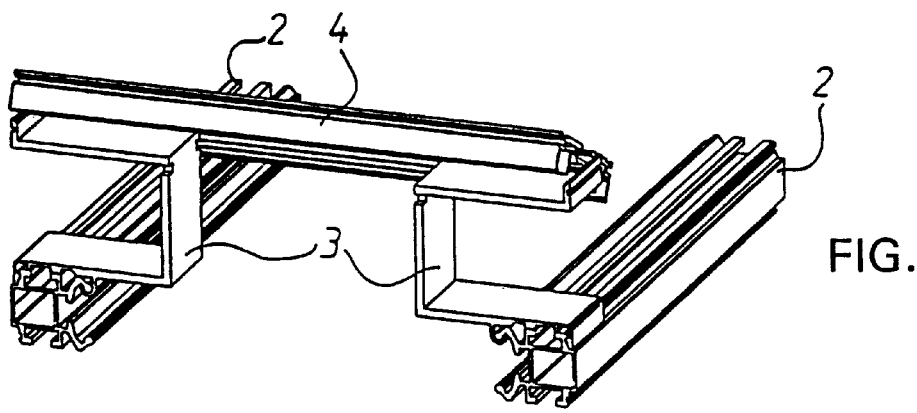
Figure 1E:
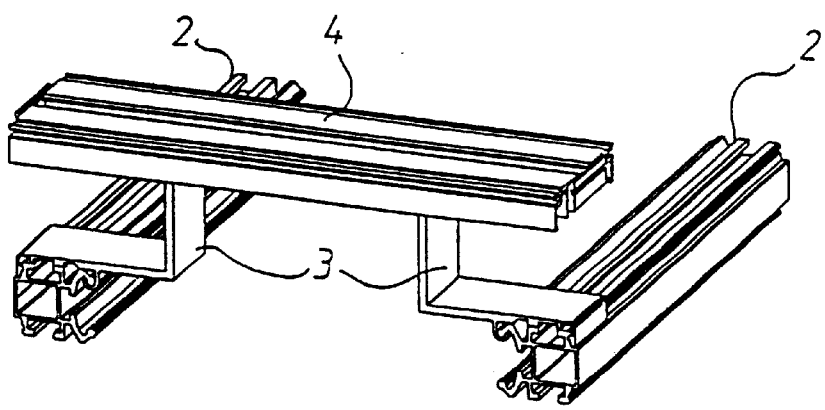
Figure 1F:
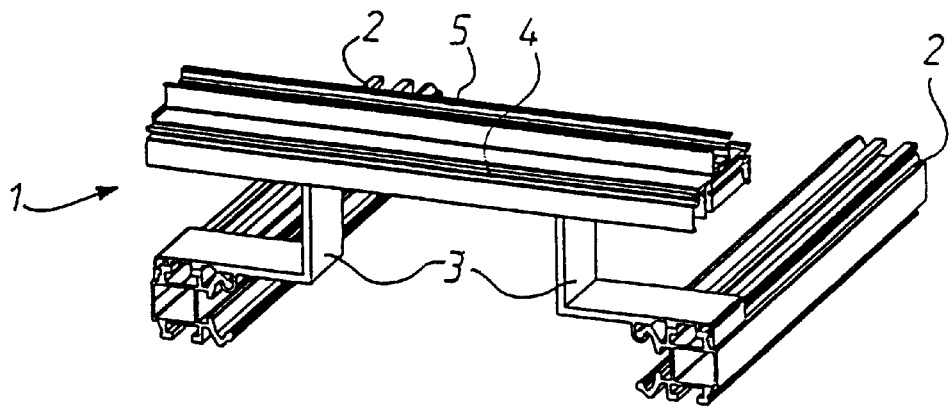
Figure 2:
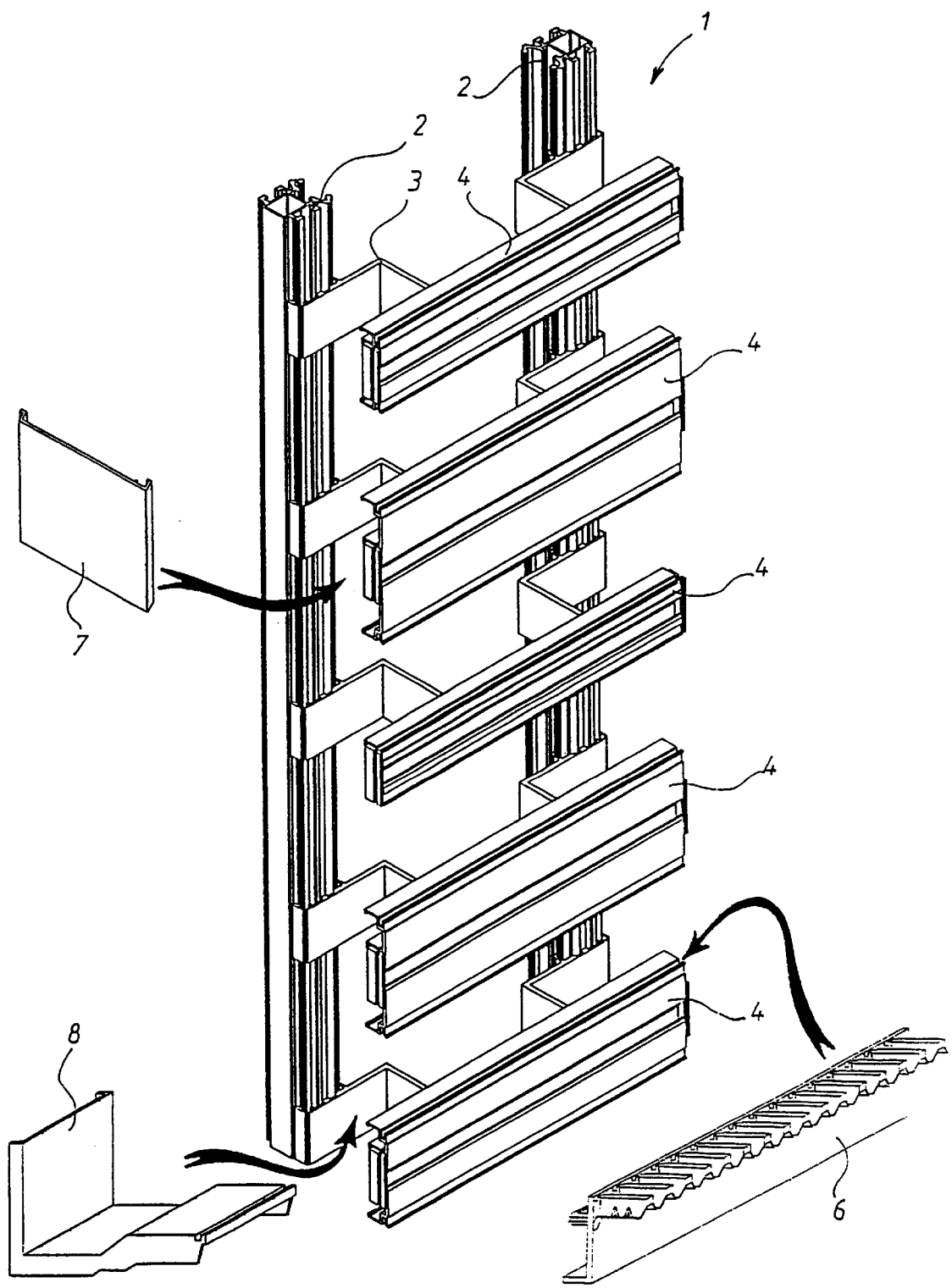

With reference to FIGS. 1 and 2, the wiring frame 1 is obtained by assembling various metal sections comprising it, according to the stages of assembly listed below and in accordance with FIGS. 1A to F:

FIG. 1A: two vertical members 2 are placed parallel, flat or vertically on a work stand (not shown) at a predetermined distance from one another.

FIGS. 1B and 1C: an omega-shaped stirrup 3 designed to receive a horizontal rail 4 is fitted on each vertical member 2. Of course, as many stirrups shall be put in place as there are horizontal rails provided.

FIGS. 1D and 1E: a horizontal rail 4, sized to meet requirements both in terms of length and width, is then fitted on each pair of stirrups 3, FIG. 1F: a support 5 designed to receive electrical devices such as switches, relays, circuit breakers, etc. is finally fitted on each horizontal rail 4.

If required, this support 5 can extend over a length which is shorter than that of the horizontal rail.

The wiring frame 1 obtained and shown in FIG. 2 is then completed with binding post combs 6 mounted on the horizontal rails 4, the purpose of which is to hold in position the electrical cables connected to said devices, side plates 7 to close the sides of the frame, insulating covers 8 mounted on the stirrups 3. If several wiring frames are placed side by side, covers 9 (described later) are provided to link them up and thus seal off the empty spaces. This frame 1 can then be mounted in a switch cabinet (not shown) by means of well known fastening devices or in any other suitable housing.

The various metal sections mentioned are now itemized with reference to FIGS. 3 to 17.

Figures 3, 5, 6:
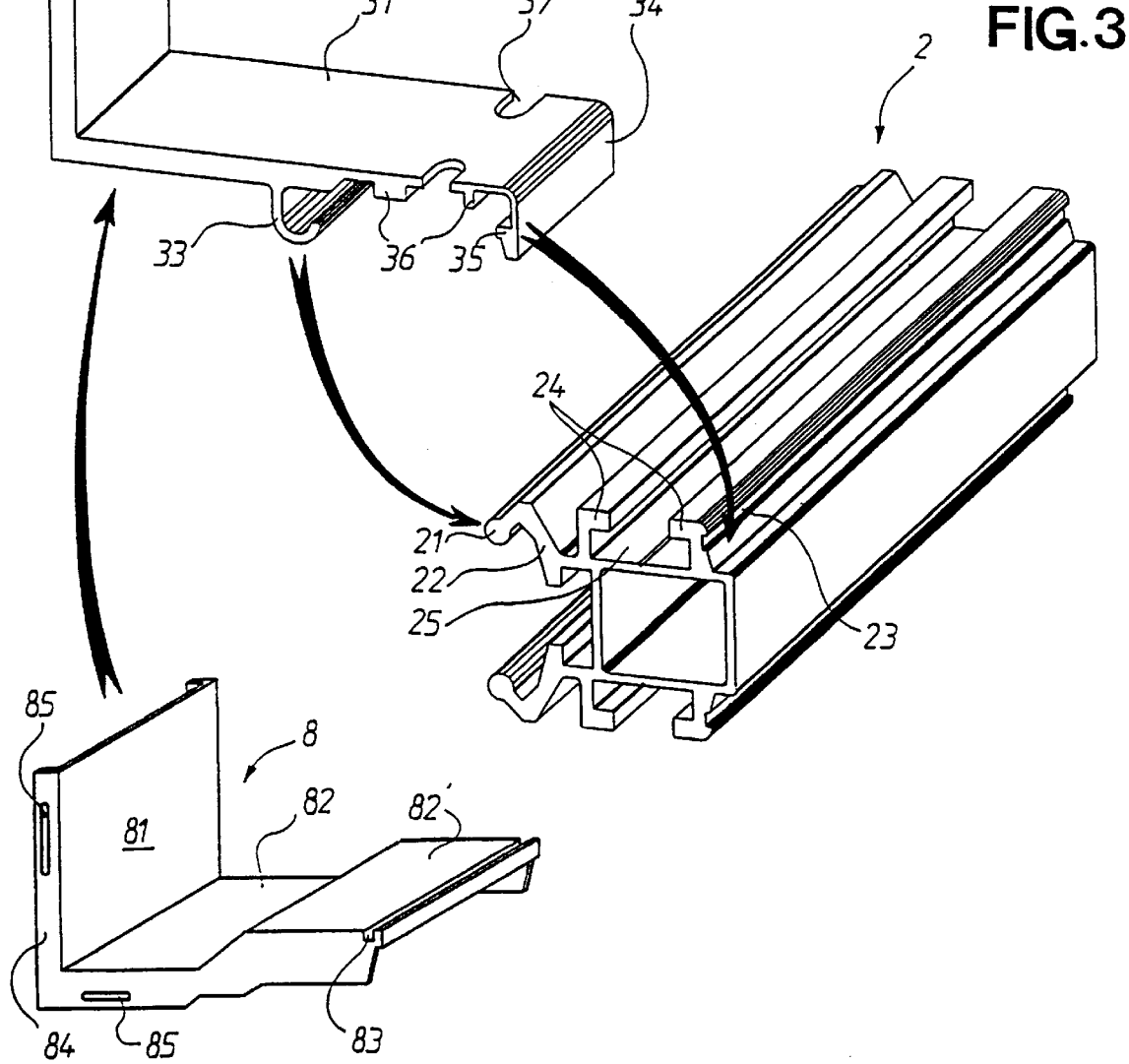
Figure 4:
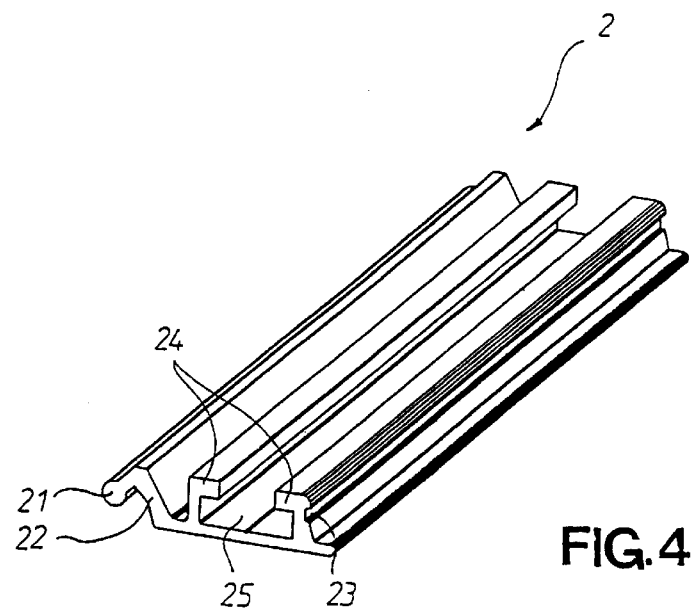

The vertical member 2, shown in FIGS. 3 and 4, comprises a metal section which is flat or has a square overall cross-sectional area or any other suitable shape. On one side, it comprises on one of the edges a rounded pivot 21 provided at the end of a curved arm 22 and on the other edge a groove 23. In the case of a square metal section, the vertical member 2 is symmetrical in relation to its center plane parallel to the side provided with the pivot 21 and the groove 23. Therefore, this vertical member 2 comprises a pivot 21 and a groove 23 on each side allowing it to be used both as a right vertical member and a left vertical member.

The stirrup 3, shown in FIG. 5, comprises an omega-shaped metal section making it possible to assemble the horizontal rails 4 on the vertical members 2 perpendicular to the latter. The base 30 of the stirrup 3 defines the spacing of the rails 4 in relation to the vertical members 2 and the space defined between the branches 31, 32 of the stirrup is used to arrange the bundles of electrical cables. On its branch 31 located on the vertical member 2 side, this stirrup 3 comprises an outer projection forming a rounded hook 33 and an outwardly bent free end forming a tongue 34 provided with a nose 35. The hook 33 is designed to fit onto the pivot 21 and the nose 35 is designed to lock into the groove 23 after a rotation of the stirrup 3 around said pivot 21, due to the elastic deformation of the tongue 34. This rotation allowing the stirrup 3 to fit and lock onto the vertical member 2 is shown clearly by FIG. 1B. To ensure that these two pieces are assembled rigidly and to avoid any risk of ill-timed unlocking and the pieces coming apart, the gap provided between the hook 33 and the nose 35 is at most equal to and preferably slightly less than that provided between the pivot 21 and the groove 23, putting said interlocking under stress. Likewise, the stirrup 3 and the vertical member 2 comprise, in their interlocking zone, reliefs formed by bosses or ribs respectively 36 and 24 arranged to form stops resting on one another which also put said interlocking under pressure. The stirrup 3 also comprises two opposing oblong holes 37, provided in the branch 31 and designed to receive locking screws (not shown) making it possible to lock said stirrup in a fixed position on the vertical member 2. For this purpose, the vertical member 2 comprises an upside down T-shaped groove 25, arranged to receive the head of the locking screws or the nuts associated with these screws. As this groove 25 is provided over the whole length of the vertical member 2, it is easy to understand that the stirrups 3 can be placed anywhere along said member. The edges of this groove 25 also form the above-mentioned stops 24. The stirrup 3 also comprises a free end 38 on its branch 32 located on the horizontal rail 4 side, which is bent outwardly and forms an angle of approximately 90° with its branch 32, and is provided with a groove 39. The design of this stirrup 3 allows it to be able to be placed both on the left vertical member or the right vertical member.

The insulating cover 8, shown in FIG. 6, is designed to partially cover the stirrup 3 to electrically insulate the horizontal rails 4 on the vertical members 2. It is made of a dielectric molded plastic material and is L-shaped, the small branch 81 of which fits onto the base 30 while the big branch 82 fits onto the branch 31 of the stirrup 3. This big branch 82 comprises on its free end a groove 83 which can receive the side plate 7 or the cover 9 as described in detail later on. This insulating cover 8 is extended laterally by edges 84 fitted with small snugs 85 which fit on at the rear of the stirrup 3 and ensure that the cover 8 is held on the stirrup 3. The big branch 82 comprises a raised zone 82' to leave a free space in the oblong holes 37 zone for the head of the locking screws or the nuts associated with these screws.

Figure 7:
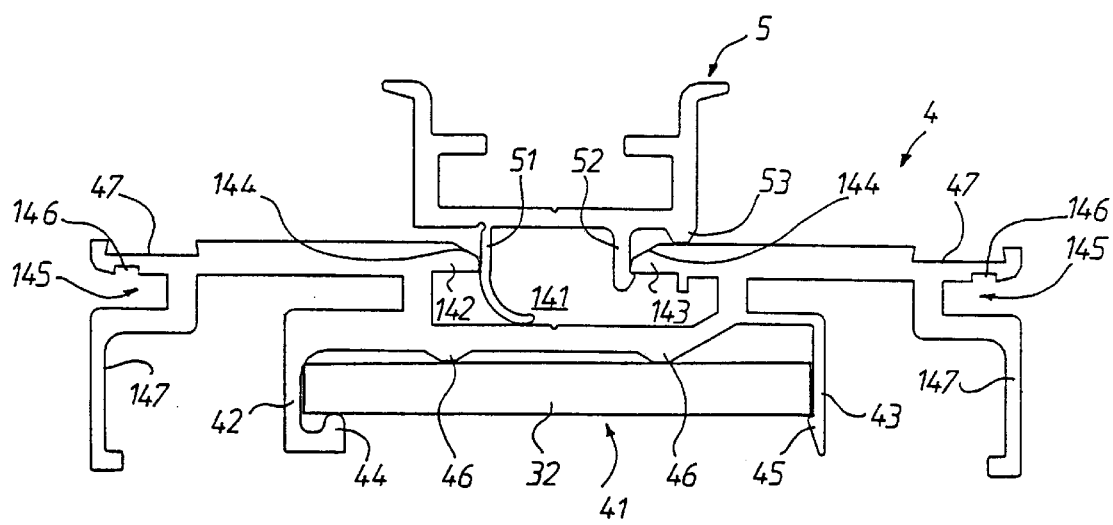
FIG. 7 is an end view of a support mounted on a horizontal rail on the frame.

The horizontal rail 4, shown in FIGS. 7, 8 and 10, comprises on the rear face, a C-shaped groove 41 designed to receive the branch 32 of the stirrup 3 between its branches 42, 43. The free end of its branch 42 is curved and comprises an enlargement 44 and the free end of its branch 43 forms a tongue provided with a nose 45. To fit the horizontal rail 4 on the branch 32 of the stirrup 3, the branch 42 with its enlargement 44 is fitted on one of the edges of this branch 32 and the horizontal rail 4 is made to rotate until the other edge of the branch 32 of the stirrup 3 fits into the branch 43, with the nose 45 locking this assembly, due to the elasticity of the tongue 43. To ensure that these two pieces are assembled rigidly and to avoid any risk of ill-timed unlocking and the pieces coming apart, the gap provided between the branches 42 and 43 of the groove is at most equal to and preferably slightly less than the width of the branch 32, putting said interlocking under stress. Likewise, bosses 46 are provided in the bottom of this groove 41 to form stops resting on the branch 32 which also puts said interlocking under stress. On its front, this horizontal rail 4 comprises an upside down T-shaped groove 141, parallel to the C-shaped groove. These two grooves are placed substantially back to back. This groove 141 is designed to receive the support 5, with the free edges 142 and 143 of the T-shaped groove presenting a chamfer 144 designed to facilitate the interlocking of said support 5. The longitudinal edges of the horizontal rail 8 also comprise a U-shaped groove 145 the opening of which is substantially perpendicular to those of the grooves 41 and 141, the groove 145 comprising a longitudinal recess 146 at least on one of its branches, and being designed to receive a binding post comb to hold in position the electrical cables connected to said electrical devices borne by the support 5. This horizontal rail 8 can present varying widths according to requirements whilst being compatible with the other metal sections, with grooves 41, 141 and 145 remaining identical. The horizontal rail 8 in FIG. 8 presents an average width whereas the one in FIGS. 7 and 10 present a width which is almost double that of the rail in FIG. 8. In this case, the horizontal rail 8 comprises longitudinal free edges 147 which are bent backwards substantially parallel to the branches 42 and 43 of the C-shaped groove 41. On the front, this horizontal rail 4 also comprises two flat grooves 47 arranged on either side of the groove 141 and arranged to receive identification markers designed to identify the electrical devices borne by the frame 1.

The support 5, with reference to FIG. 9, comprises a standardized U-shaped metal section, provided with two catching tabs 51, 52 on the rear face designed to be housed in the upside down T-shaped groove 141 provided on the front of the horizontal rail 4. The tab 51 is longer than the tab 52 and its curved free end is designed to rest on the bottom of the groove 141. At its free end, the tab 52 comprises a hook designed to lock at the rear of the corresponding free edge 143 of the groove 141. Furthermore, this support 5 comprises a longitudinal boss 53 parallel to the tab 52 and arranged to rest on the outside of the free edge 143. The gap between the boss 53 and the tab's 52 hook is at most equal to the thickness of said free edge 143 so as to put said interlocking under pressure. The support 5 is fitted into the groove 141 of the horizontal rail 4 by rotating around the supporting point or line formed by the boss 53 resting on the rail 4 until the tab 52 locks in at the rear of the free edge 143, the end of the tab 51 coming to rest on the bottom of the groove 141 to stabilize the position of the support 5 horizontally in relation to said rail 4. The both rounded and beveled shape of both the free ends of the catching tabs 51, 52 and the chamfer 144 provided on the free edges 142, 143 of said groove 141 facilitate the insertion of the catching tabs 51, 52. To ensure that these two pieces are assembled rigidly and to avoid any risk of ill-timed unlocking and the pieces coming apart, the outer gap defined by the catching tabs 51 and 52 is at least equal to and preferably slightly greater than the gap between the two free edges 142, 143 of the groove 141 putting said interlocking under pressure. The front of this support 5 is standardized and known to the expert, given the fact that all the types of electrical devices intended to be installed in a switch cabinet present matching shapes at the rear arranged to co-operate with said support 5.

The binding post comb 6 is shown by FIGS. 11A to D and 12. This comb 6 is comprised of a plurality of parallel teeth 61 spaced out at regular intervals fixed securely to a longitudinal body 62. On its sides, each tooth 61 has at least one and preferably three notches 63, a first notch provided at the base and two others at the top of the tooth. These notches define housings between two consecutive teeth to receive electric cables 63' held by pinching them. This comb 6 comprises a fastening foot 64 designed to be housed in the U-shaped groove 145 provided in the horizontal rail 4, by fitting it after the comb 6 translates towards the horizontal rail 4 substantially perpendicular to said groove 145. This fastening foot 64, which can be longitudinal or in the form of regularly spaced out dog points, comprises two parallel tongues 65, 66 one of which has a notch 67 designed to fit into the corresponding recess 146 provided in the groove 145, thereby locking this assembly. The body 62 of the comb 6 extends towards the rear and ends with a heel 68 located substantially at right angles and designed to fit onto one of the longitudinal edges 147 of the horizontal rail 4, as shown in FIG. 12, or on the branches 42, 43 of said horizontal rail 4 if its width is smaller. To ensure that these two pieces are assembled rigidly and to avoid any risk of ill-timed unlocking and the pieces coming apart, the gap between the foot 64 and the heel 68 is at most equal to and preferably slightly less than the width of the free edge 147 or of the branches 42, 43, putting said interlocking under pressure.

A cover 10, shown by FIG. 13, is provided to couple two superposed binding post combs 6 in order to avoid any free spaces. This cover 10 comprises a U-shaped metal section, the branches 11, 12 of which are ended with locking noses 13 arranged to fit and lock onto the free end of the teeth 61 opposite. The base 14 of the cover 10 extends laterally beyond the branches 11, 12 forming a stop which rests on the rear of said teeth 61, giving an attractive finish to the assembly between two combs 6. A flat groove 15 is provided on the base 14 of the cover 10 and makes it possible to receive identification markers to identify the electrical devices borne by said frame 1.

A cover 9, shown by FIGS. 14 and 15, makes it possible to attractively link two consecutive frames 1 by closing the empty spaces provided between them. On its longitudinal free edges, this cover 9 comprises a groove 91 and a catching tab 92 substantially perpendicular to the latter, provided with a longitudinal rib 93. A first cover 9 is fitted on the free edges of the large branches 82 of the insulating covers 8 and a second cover 9 is fitted on the curved free ends 38 of the branches 32 of the stirrups 3 by a translation of the covers respectively in the direction of the insulating covers 8 and the stirrups 3. In the first assembly, the groove 91 fits into the groove 83 and the rib 93 fits at the rear of this groove thus locking this assembly due to the elasticity of the catching tab 92. In the second assembly, the groove 91 fits onto the edge of the free end 38 and the rib 93 fits into the groove 39 thus locking this assembly due to the elasticity of the catching tab 92. This cover 9 comprises deformable longitudinal undulations, in a central zone, making it possible to adapt the width of the cover 9 to the gap between the two consecutive frames 1 and even make up the difference in levels between these two frames. It is made of a molded synthetic material which allows this permanent deformation and can of course extend over the whole height of the frames 1.

The side plate 7, shown in FIGS. 16 and 17, make it possible to close the sides of the frame 1 to obtain an attractively finished frame. This side plate 7 comprises a plate made of substantially rectangular molded synthetic material, provided with two longitudinal free edges 71, 72. On the free edge 71, it comprises a longitudinal groove 73 and a rib 74 designed to fit respectively onto the curved free edge 38 and into the groove 39 of the branch 32 of the stirrup 3. On the free edge 72, it comprises an L-shaped folded up longitudinal tab 75 designed to fit into the groove 83 provided on the insulating cover 8. This side plate 7 is put in place by a translation of the flange in the direction of the stirrup and fitting the flange in the grooves due to its elasticity. This flange 7 can of course extend over the whole height of the frame 1.

It is clear from this description that the various metal sections and various pieces comprising the frame are designed to be assembled easily without any tools whilst ensuring great assembly rigidity as well as a reliable and durable support for the electrical devices, to adapt to the specific requirements of each user, to also be able to be dismantled easily in the event of a modification or addition being necessary, to slide in relation to one another and allow them to be positioned accurately, etc. All the metal sections making up the vertical members 2, the stirrups 3, the horizontal rails 4 and the supports 5 are advantageously made of extruded aluminum. Nevertheless, they could also be made by extrusion, in steel, stainless steel, aluminum alloy or in synthetic material. The other pieces such as the binding post combs 6, the side plates 7, the insulating covers 8 and the covers 9 offer the advantage of being made of molded synthetic material.

The present invention is not limited to the example of embodiment described but can be widened to include any modification or alternative which is obvious for the expert. In particular, the shapes and sizes described for each component part may vary, provided that they make it possible to fulfill the same functions. The matching fitting and locking means may also be different and co-operate with one another by means of various movements of translation and/or rotation, the main thing being that they make it possible to ensure a tool-free, dismountable, rigid and reliable assembly.

What is claimed is:

1. Electrical wiring frame (1) designed to house electrical devices and the wiring thereof, comprising at least two vertical members (2) arranged in parallel planes and at least one horizontal rail (4) coupled to the vertical members by at least two generally omega-shaped stirrups (3), the base of the stirrups determining the distance between the horizontal rail and the vertical members, the internal space defined by these stirrups being used as a cable duct, the horizontal rail being provided with a standardized support (5) designed to house the electrical devices and with at least one binding post comb (6) arranged parallel to the support designed to fix in position the electric cables connected to said electrical devices, characterized in that the assembly of the stirrups (3) on the vertical members (2), the horizontal rail (4) on the stirrups, the support (5) and the binding post comb (6) on the horizontal rail is achieved by fitting and locking them together in a removable manner, the elements to be assembled together respectively comprising matching fitting and locking means designed to co-operate with one another.

2. Frame according to claim 1, characterized in that matching fitting and locking means are arranged to co-operate with one another by bringing said elements together in a movement of translation perpendicular to said elements.

3. Frame according to claim 1, characterized in that characterized in that matching fitting and locking means are arranged to co-operate with one another by bringing said elements together in a movement of rotation.

4. Frame according to claim 3, characterized in that the vertical member (2) is formed by a metal section, one side of which comprises a rounded pivot (21) on one of the edges and a groove (23) on the other edge.

5. Frame according to claim 4, characterized in that vertical member (2) presents a substantially square overall cross-sectional area which is symmetrical in relation to a center plane parallel to said side provided with the pivot and the groove.

6. Frame according to claim 4, characterized in that on its branch (31) located on the vertical member (2) side, the stirrup (3) comprises an external projection forming a rounded hook (33) designed to fit onto the pivot (21) provided on said vertical member (2) and an outwardly curved free end forming an elastic tongue (34) provided with a nose (35) arranged to lock into the groove (23) provided on said vertical member by fitting into it after the stirrup has rotated around said pivot, the distance between the hook and the nose being less than or equal to the distance between the pivot and the groove, the stirrup and/or the vertical member comprising reliefs (24, 36) in the interlocking zone, designed to form stops.

7. Frame according to claim 6, characterized in that on its branch (31) located on the vertical member (2) side, the stirrup (3) comprises at least one hole (37) designed to receive a fastening device mounted to slide in a groove (25) provided in the vertical member (2) and designed to lock the position of said stirrup.

8. Frame according to claim 6, characterized in that on its branch (32) located on the horizontal rail (4) side, the stirrup (3) comprises a free end (38) which is outwardly curved forming an angle of approximately 90° with its branch and is provided with a groove (39).

9. Frame according to claim 8, characterized in that the horizontal rail (4) is formed by a metal section comprising a C-shaped longitudinal groove (41) on its rear face, the free end of one of the branches (42) being curved and having an enlargement (44) designed to fit onto a first edge of the corresponding branch (32) of said stirrup and the free end of the other branch (43) forming an elastic tongue provided with a nose (45) designed to lock onto the second edge of the corresponding branch (32) of said stirrup by fitting onto it after said horizontal rail has rotated around said first edge, the distance between the two branches of the C-shaped groove being at most equal to the width of the stirrup's branch, the stirrup and/or the horizontal rail comprising reliefs (46) in the interlocking zone, designed to form stops.

10. Frame according to claim 9, characterized in that the horizontal rail (4) comprises an upside down T-shaped longitudinal groove (141) on the front.

11. Frame according to claim 10, characterized in that the support (5) is formed by a metal section and on the rear face it comprises two elastic catching tabs (51, 52) and a boss (53), the tabs (51, 52) are arranged to fit into the T-shaped groove (141) provided on the front of the horizontal rail (4) after a rotation around the boss (53) while resting on said rail (4), the end of one of the tabs (51) being curved to rest on the bottom of the groove (141) and the end of the other tab (52) having a hook to lock itself at the rear of the corresponding free end (143) of said groove (141), the outside distance defined by the two tabs (51, 52) being at least equal to the space between the two free edges (142, 143) of the groove (141) and the distance between the boss (53) and the tab's (52) hook being at most equal to the thickness of said free edge (143).

12. Frame according to claims 2, characterized in that the horizontal rail (4) comprises, on its longitudinal edges, at least one U-shaped longitudinal groove (145) provided with at least one longitudinal recess (146) in one of its branches, and the binding post comb (6) comprises a fastening foot (64) provided with two elastic tongues (65, 66) one of which has a notch (67) designed to lock into the longitudinal recess (146) provided in said U-shaped groove by fitting the foot after the binding post comb translates in the direction of the horizontal rail.

13. Frame according to claim 12, characterized in that the binding post comb (6) preferably comprises a rear extension (62) ended with a heel (68) designed to fit onto the rear part of the horizontal rail (4), the space between the heel (68) and the fastening foot (64) being less than or equal to the width of said rail in the interlocking zone.

14. Frame according to claim 13, characterized in that the binding post comb (6) also comprises a plurality of teeth (61) parallel to one another, each of which comprises on its sides at least one cell (63) forming a housing between two consecutive teeth to receive an electrical cable (63') and keep it in position.

15. Frame according to claim 8, characterized in that it comprises an insulating cover (8) designed to cover at least partially said stirrup (3), comprising at least one large branch (82) coupled to the branch (31) located on the vertical member (2) side and provided with a groove (83) on its free end.

16. Frame according to claim 15, characterized in that it also comprises at least one cover (9) arranged to cover the gap between two frames (1) placed side by side, said cover comprising at least one groove (91) on its longitudinal edges, which is designed to fit onto the corresponding free ends of the branches (32, 82) of the stirrup (3) and the insulating cover (8).

17. Frame according to claim 16, characterized in that the cover (9) comprises at least in a central zone, deformable longitudinal undulations (94) arranged to adapt the width of the cover (9) to the gap between the two frames (1) and make up the difference in levels between the two frames.

18. Frame according to claim 15, characterized in that it comprises at least one side plate (7) arranged to close the sides of said frame (1), said flange comprising on its longitudinal edges (71, 72) at least one groove (73) arranged to fit onto the free ends of the corresponding branches (32, 82) of the stirrup (3) and the insulating cover (8).

19. Frame according to claim 1, characterized in that the vertical members (2), the horizontal rails (4), the stirrups (3) and the supports (5) are made by extrusion, from a material chosen from the group which includes aluminum, aluminum alloy, stainless steel, steel and synthetic materials.

20. Frame according to claim 1, characterized in that the insulating covers (8), the binding post combs (6), the covers (9) and the side plates (7) are made from a dielectric synthetic material.

* * * * *